(12) United States Patent
Elnozahy et al.

(10) Patent No.: US 8,271,831 B2
(45) Date of Patent: Sep. 18, 2012

(54) TOLERATING SOFT ERRORS BY SELECTIVE DUPLICATION

(75) Inventors: Elmootazbellah Nabil Elnozahy, Austin, TX (US); Mark William Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/788,968

(22) Filed: May 27, 2010

(65) Prior Publication Data

US 2011/0296228 A1  Dec. 1, 2011

(51) Int. Cl.
  *G06F 11/00* (2006.01)
(52) U.S. Cl. ......................................................... 714/10
(58) Field of Classification Search ...................... 714/10
  See application file for complete search history.

(56) References Cited

U.S. PATENT DOCUMENTS

| | | | |
|---|---|---|---|
| 6,640,313 B1 * | 10/2003 | Quach | 714/10 |
| 7,331,043 B2 | 2/2008 | Saulsbury | |
| 2002/0199175 A1 * | 12/2002 | Saulsbury | 717/141 |
| 2004/0153763 A1 * | 8/2004 | Grochowski et al. | 714/17 |
| 2005/0138478 A1 | 6/2005 | Stafford et al. | |
| 2006/0036909 A1 | 2/2006 | VanBuren | |
| 2007/0044003 A1 | 2/2007 | Doweck et al. | |
| 2009/0113240 A1 | 4/2009 | Vera et al. | |
| 2010/0138608 A1 | 6/2010 | Rappoport et al. | |
| 2011/0072303 A1 * | 3/2011 | Hoogerbrugge | 714/10 |

OTHER PUBLICATIONS

Biswas et al; Quantized AVF: A Means of Capturing Vulnerability Variations over Small Windows of Time, USA.
Li et al; Resil: A Resiliency Hardware/Software Framework for ASIPs.
Latif et al; Soft Error Protection via Fault-Resilient Data Representations, USA.
Wappler et al; Software Protection Mechanisms for Dependable Systems, 947-952, 2008 EDAA.

* cited by examiner

*Primary Examiner* — Bryce Bonzo
(74) *Attorney, Agent, or Firm* — Garg Law Firm, PLLC; Rakesh Garg; Libby Z. Toub

(57) ABSTRACT

A method, system, and computer usable program product for tolerating soft errors by selective duplication are provided in the illustrative embodiments. An application executing in a data processing system, selects an instruction that has to be protected from soft errors. The instruction is marked for duplication such that the instruction is duplicated during execution of the instruction. The marked instruction is sent for execution to a hardware front end.

20 Claims, 6 Drawing Sheets

TOLERATING SOFT ERRORS BY SELECTIVE DUPLICATION

RELATED APPLICATION

The present invention is related to similar subject matter of co-pending and commonly assigned U.S. patent application Ser. No. 12/789,045 entitled "Energy efficient fault detection and masking," filed on May 27, 2010, which is hereby incorporated by reference.

BACKGROUND OF THE INVENTION

1. Field of the Invention

The present invention relates generally to an improved data processing system, and in particular, to a computer implemented method for improving failure tolerance in data processing systems. Still more particularly, the present invention relates to a computer implemented method, system, and computer usable program code for tolerating soft errors by selectively duplicating computation.

2. Description of the Related Art

An application may produce an incorrect output during execution. The incorrect output may be caused by an error in the code or by a soft error. A soft error is an error that occurs when, for example, a bit in a memory gets set or reset without an instruction of the application causing the bit to change.

A soft error is not a permanent failure because the same bit may not flip and the same error may not occur again during another execution of the application. Some reasons for soft errors are noise on a communication line, power surges, and cosmic radiation.

A soft error can be corrected by rewriting the incorrect data with the correct data, such as by setting an affected bit to the correct state. Current technology provides methods for handling soft errors. One method of soft error failure detection is to use error correction code. An error correction code, such as code implemented in an error correction tool, detects a soft error on the fly and performs computations to correct the error. Another method of handling soft errors is masking. Masking is a method where an error is prevented from propagating in a manner that the output of the application remains unaffected by the error.

SUMMARY OF THE INVENTION

The illustrative embodiments provide a method, system, and computer usable program product for tolerating soft errors by selective duplication. An embodiment selects, at an application executing in a data processing system, an instruction that has to be protected from soft errors. The embodiment marks the instruction for duplication such that the instruction is duplicated during execution of the instruction. The embodiment sends the marked instruction for execution to a hardware front end.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Soft errors are becoming an increasing concern as applications increase in complexity, data processing system circuitry becomes more complex, and the potential for soft errors broadens. In the prior art, soft errors are handled using fault detection and/or masking methods that constitute a significant cost factor. For example, some prior art methods use electronic circuitry to protect data path, registers, and other regions of memory from soft errors. Typically, these electronic circuits provide fault detection, error correction, and masking features to protect against a variety of errors including soft errors.

The invention recognizes that such prior art circuitry for handling soft errors is nontrivially expensive. The invention further recognizes that because the prior art methods are all or nothing methods, the cost of those methods is not just in the fabrication but also in the power consumption. For example, a prior art method may employ duplicate circuits (hardware duplication) for executing an instruction to detect and eliminate error by comparing the output of the duplicate computations. The invention recognizes that the cost of using such a method includes, among other costs, the power and other computing resources consumed in operating the duplicate circuits.

Another method employs duplicate execution of an instruction in time (temporal duplication). In such a method the instructions are executed multiple times and the result of multiple computations used for detecting and eliminating errors. The invention recognizes that the cost of using such a method includes, among other costs, the time and other computing resources consumed in performing duplicate executions.

The invention recognizes that some soft errors do not affect an output of an application at all. Some soft errors affect the output but in ways that may not be significant. Accordingly, the invention recognizes that an economical and efficient method of tolerating soft errors need not handle all soft errors that are possible. The invention further recognizes that not all instructions of the code of an application are equally susceptible to soft errors.

The illustrative embodiments used to describe the invention generally address and solve the above-described problems and other problems related to handling soft errors. The illustrative embodiments of the invention provide a method, computer usable program product, and data processing system for tolerating soft errors by selective duplication. An embodiment identifies certain instructions that should be duplicated to handle soft errors at an acceptable level of tolerance. The duplication of the selected instructions according to an embodiment can be hardware duplication or temporal duplication as may be suitable for a particular implementation.

The illustrative embodiments are described with respect to data, data structures, and identifiers only as examples. Such descriptions are not intended to be limiting on the invention. For example, an illustrative embodiment described using one method of identifying a selected instruction may be implemented using a different method of identifying the selected instruction within the scope of the invention.

Furthermore, the illustrative embodiments may be implemented with respect to any type of data processing system. For example, an illustrative embodiment described with respect to a single processor may be implemented in a multiprocessor or multi-core processor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to a single bit or a bitmask may be implemented using another type, size, and arrangement of flag data, in a similar manner within the scope of the invention. As another example, an embodiment described using one duplication configuration may be implemented using a different duplication configuration within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in a combination of hardware and software. The examples in this disclosure are used only for the clarity of the description and are not limiting on the illustrative embodiments. Additional or different information, data, operations, actions, tasks, activities, and manipulations will be conceivable from this disclosure for similar purposes and the same are contemplated within the scope of the illustrative embodiments.

The illustrative embodiments are described using specific code, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
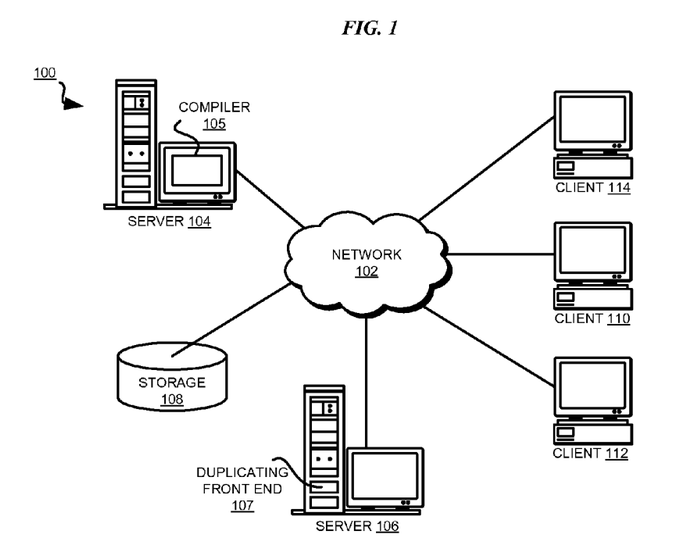
FIG. 1 depicts a pictorial representation of a network of data processing systems in which the illustrative embodiments may be implemented.
Figure 2:
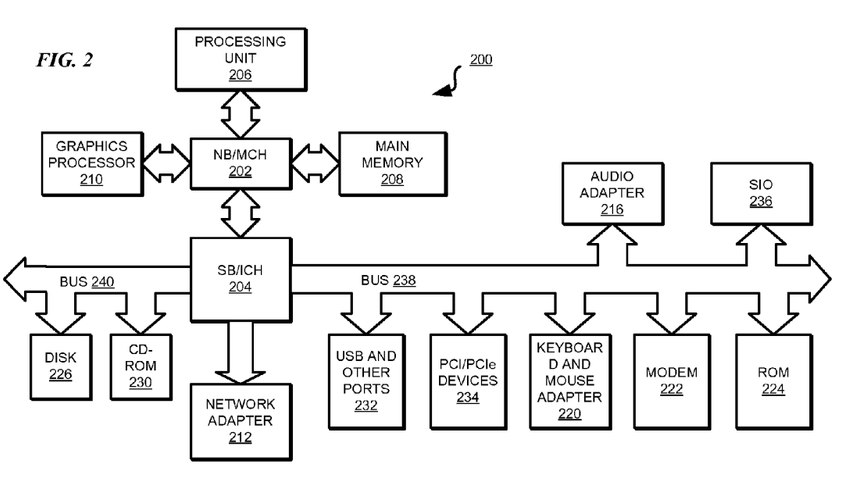
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include compiler 105. Compiler 105 may select and identify an instruction for duplication in accordance with an illustrative embodiment. Server 106 includes duplication front end 107. Duplication front end 107 recognizes the selected instruction and triggers the execution of the selected instruction using any manner of soft error fault tolerance. For example, one embodiment of duplicating front end 107 may operate using a temporal duplication implementation. Another embodiment of duplicating front end 107 may operate using a hardware duplication implementation.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux° (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
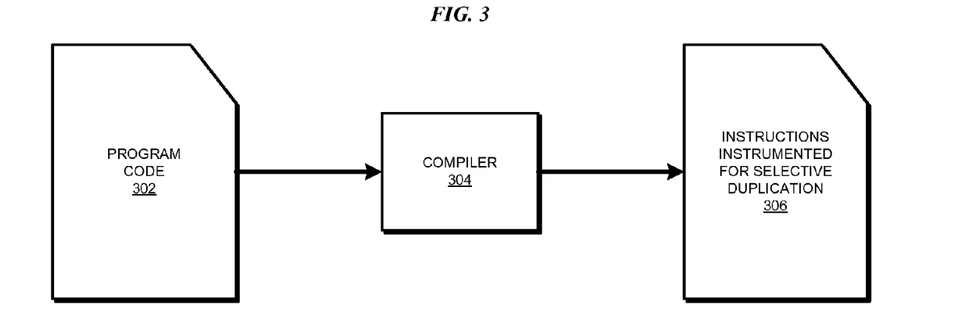
FIG. 3 depicts a block diagram of an example method of tolerating soft errors by selective duplication in accordance with an illustrative embodiment.

With reference to FIG. 3, this figure depicts a block diagram of an example method of tolerating soft errors by selective duplication in accordance with an illustrative embodiment. Program code 302 may be the code of any application. Program code 302 is compiled or otherwise transformed into executable instructions by compiler 304. Compiler 304 may be implemented using compiler 105 in FIG. 1.

Compiler 304 may be any application that transforms program code 302 into machine executable instructions. For example, in one embodiment, compiler 304 may compile program code 302 into portable executable instructions. In another embodiment, compiler 304 may be a just in time (JIT) compiler that compiles program code 302 as and when needed for execution in a given environment.

Compiler 304 includes software for selecting a set of instructions that may be susceptible to soft errors. A set of instructions is zero or more instructions. Compiler 304 identifies the selected set of instructions for duplication. Instructions 306 include the set of instructions that is generated for selective duplication according to an embodiment by way of this selection and identification.

An instruction is susceptible to soft errors if a soft error causes a computation using the instruction to produce an incorrect output. Whether an instruction is susceptible to soft error can be determined by any example embodiments for making such determination as described elsewhere in this disclosure.

Furthermore, the selection of an instruction into the set of instructions may depend not only on whether the instruction is susceptible but also on a degree of that susceptibility. The degree of susceptibility of an instruction to soft errors can be determined by any example embodiments for making such determination as described elsewhere in this disclosure.

Furthermore, the selection of an instruction into the set of instructions may depend on the user's ability to notice errors in the output. For instance, slight errors in audio, image, and video processing may not be observable to human perception.

Additionally, compiler 304 may identify a selected instruction in any suitable manner. Some embodiments herein describe an example way in which a bitmask identifies the selected instruction in a group of instructions. An implementation may use any embodiment for identifying a particular instruction in a group of instructions within the scope of the invention.

Figure 4:
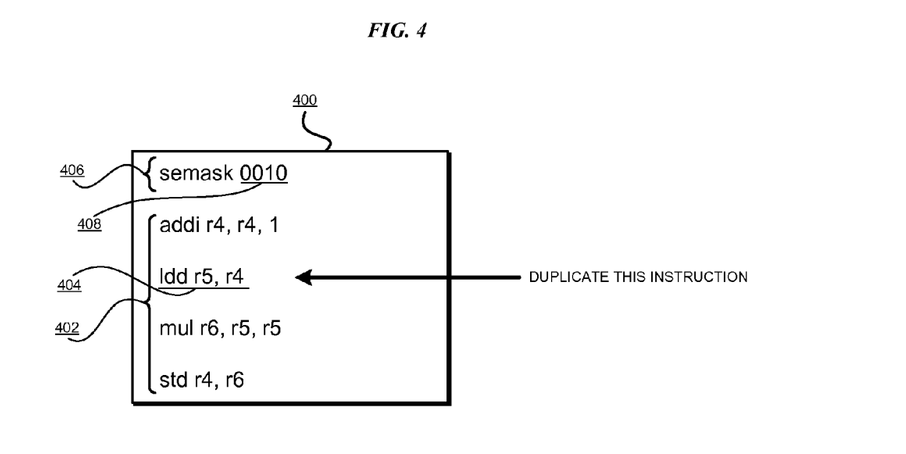
FIG. 4 depicts a block diagram of an example method of generating code for a set of instructions in accordance with an illustrative embodiment.

With reference to FIG. 4, this figure depicts a block diagram of an example method of generating code for a set of instructions in accordance with an illustrative embodiment. The generated instructions 400 are produced using a compiler according to an embodiment, such as compiler 304 in FIG. 3.

The set of generated instructions 400 include instructions 402 that may result from compiling a program code of an application, such as program code 302 in FIG. 3. In accordance with an embodiment, instructions 402 include instruction 404 that may be determined to be susceptible to soft errors. Accordingly, the compiler may identify instruction 404 for selective duplication.

The compiler may identify the selected instruction, instruction 404, in any manner suitable, including but not limited to the example method described here. In the depicted example, the compiler may insert instruction 406 in instructions 400. Instruction 406 "semask" represents an instruction that specifies a "soft error mask" including bitmask 408. Bitmask 408 identifies, such as to a duplicating front end according to an embodiment, which instruction in instructions 402 to duplicate.

In the depicted example, bitmask "0010", having the second bit set, indicates that the second instruction in instructions 402, to with, instruction 404, is to be duplicated. As another example, "0011" may indicate that instructions in position 1 and 2 in instructions 402 are to be duplicated.

Instruction 406 "semask" is only an example extension of an instruction set architecture (ISA) and is not intended to be limiting on the invention. An implementation may identify the selected instruction in any manner without departing the scope of the invention. For example, an implementation can add a bit to an instruction to indicate whether the instruction is selected for duplication. An implementation can add a bit to several instructions and set the bit associated with a selected instruction to a specific value to identify the selected instruction. Other ways of marking or distinguishing the selected instruction can be used within the scope of the invention.

Figure 5:
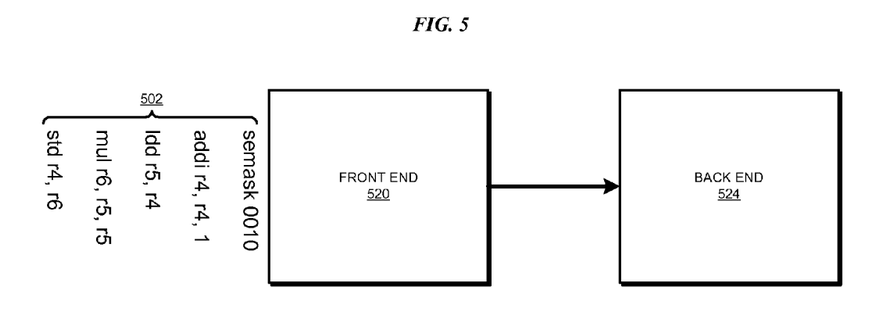
FIG. 5 depicts a block diagram of selective duplication using a duplicating front end in accordance with an illustrative embodiment.

With reference to FIG. 5, this figure depicts a block diagram of selective duplication using a duplicating front end in accordance with an illustrative embodiment. Instructions 502 may be similar to instructions 400 in FIG. 4.

Instructions 502 are the instructions of an application program code and are the result of compiling for selective duplication for tolerating soft errors according to an embodiment. During execution, front end 520 receives instructions 502.

A front end is a hardware configuration that receives instructions for execution. The front end receives instructions in order and translates the instructions, one at a time, into micro operations (micro ops) that can be executed by a back end. A back end is a hardware configuration for executing micro ops in any order suitable, including executing two or more micro ops in parallel.

Front end 520 is an existing front end as improved by an embodiment, such as duplicating front end 107 in FIG. 1. For example, front end 520 of an embodiment may include an improvement to recognize the "semask" or equivalent instruction, or another method of code generation used to produce instructions 502. Front end 520 is further improved to interpret the data of the instruction or other specific instructions, and process a group of instructions for selective duplication according to that data or specific instruction.

Front end 520 cracks the instructions in instruction 502, including duplicated instructions as identified, into micro ops and sends to back end 524. One or more back end 524 may receive the micro ops of the duplicated instructions. For example, in one possible configuration, two or more back ends 524 may receive the duplicated micro ops. Another configuration uses a single back end 524, but staggers the duplicate micro ops temporally.

Figure 6:
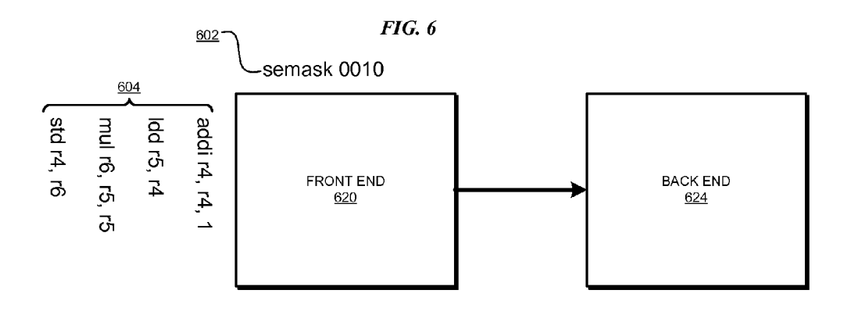
FIG. 6 depicts a block diagram of a step in selective duplication using a duplicating front end in accordance with an illustrative embodiment.

With reference to FIG. 6, this figure depicts a block diagram of a step in selective duplication using a duplicating front end in accordance with an illustrative embodiment. Instruction 602 is an instruction that informs the front end about the manner in which to selectively duplicate the instructions 604 that follow it.

Instructions 604 are the instructions of the program code of the application, such as the instructions other than the "semask" instruction in instructions 502 in FIG. 5. Front end 620 and back end 624 are similar to front end 520 and back end 524 respectively in FIG. 5.

Front end 620 recognizes instruction 602 as the instruction for selective duplication of zero or more of the subsequent instructions in instructions 604. Front end 620 may not translate instruction 602 into micro ops for backend 624 to process. Using instruction 602, front end 620 prepares to duplicate the identified instructions in 604.

Figure 7:
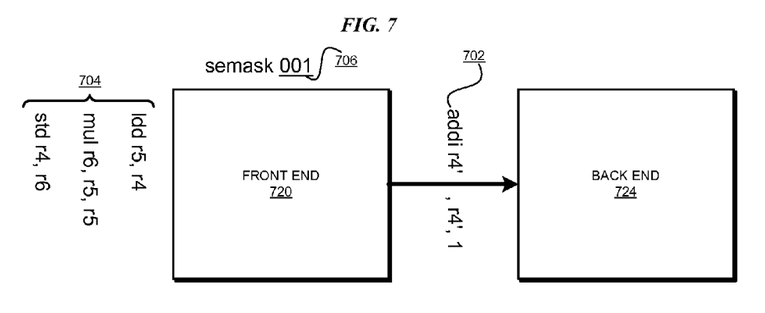
FIG. 7 depicts a block diagram of another step in selective duplication using a duplicating front end in accordance with an illustrative embodiment.

With reference to FIG. 7, this figure depicts a block diagram of another step in selective duplication using a duplicating front end in accordance with an illustrative embodiment. Front end 720 and back end 724 are similar to front end 620 and back end 624 respectively in FIG. 6.

Front end 720 reads the first bit in the bitmask of instruction 602 in FIG. 6 (rightmost bit as depicted) and translates the first instruction in instructions 604 in FIG. 6. The processing leaves instructions 704 to be processed. Bitmask 706 is the portion of the bitmask corresponding to the remaining instructions in instructions 704.

Figure 8:
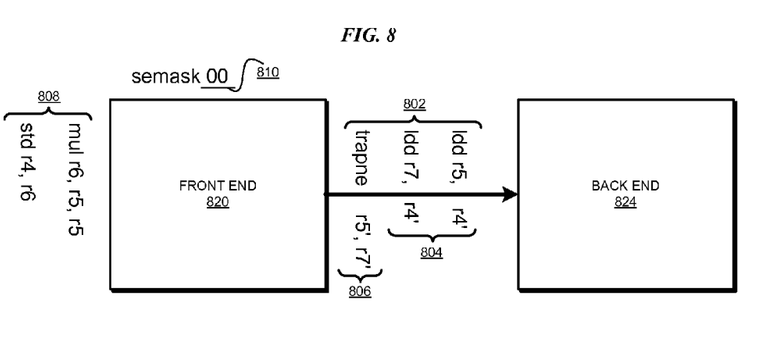
FIG. 8 depicts a block diagram of another step in selective duplication using a duplicating front end in accordance with an illustrative embodiment.

With reference to FIG. 8, this figure depicts a block diagram of another step in selective duplication using a duplicating front end in accordance with an illustrative embodiment. Front end 820 and back end 824 are similar to front end 720 and back end 724 respectively in FIG. 7.

Front end 720 reads the first bit in the remaining bitmask 706 in FIG. 7 (rightmost bit as depicted). Front end 820 duplicates the example "ldd" instruction as indicted by that bit. Front end 720 may also add additional instructions with the duplicated instruction, such as to detect errors, correct errors, or mask errors.

Micro ops 802 include micro ops 804 for the duplicated instruction and micro ops 806 for any such additional instructions, such as for trapping when the duplicated micro ops 804 produce divergent results. The processing leaves instructions 808 to be processed. The hardware performing the computations using the duplicated instructions and the additional instructions waits to write the result of the first duplicated instruction to the home location until the comparison with the result of the duplicate instruction affirms the result. Bitmask 810 is the portion of the bitmask corresponding to the remaining instructions in instructions 806.

In the depicted example, the remaining instructions in instructions 808 need not be duplicated according to remaining bitmask 810. Front end 820 cracks them into micro ops without duplicating them and sends the resulting micro ops (not shown) to back end 824.

As depicted, micro ops 802 show temporal duplication only as an example. To achieve spatial duplication, micro ops 802 could be directed to two or more back ends 824, or alternatively a backend capable of superscalar execution can simultaneously execute the independent redundant micro ops in different functional units. Such an architecture (not shown) is within the scope of the invention. Generally, micro ops 802 may be configured and directed by front end 820 in any manner to achieve selective duplication in a similar manner.

Figure 9:
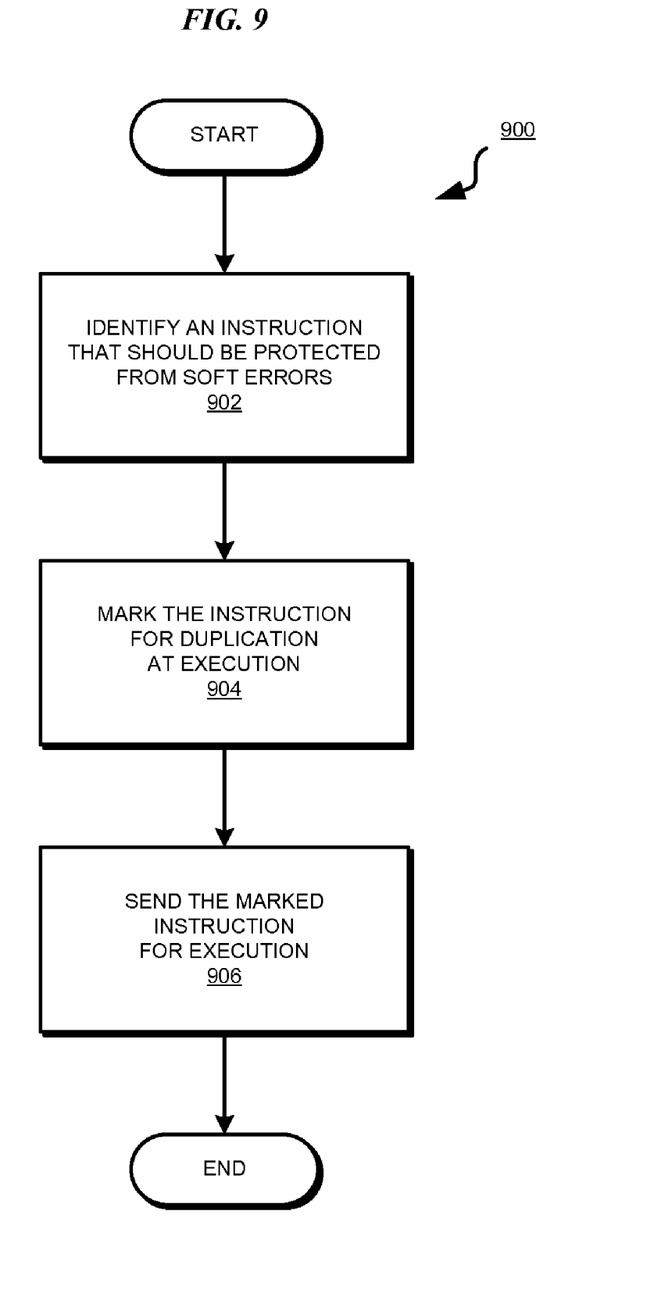
FIG. 9 depicts a flowchart of a process of identifying and generating code for selective duplication in accordance with an illustrative embodiment.

With reference to FIG. 9, this figure depicts a flowchart of a process of identifying and generating code for selective duplication in accordance with an illustrative embodiment. Process 900 may be implemented in a compiler, such as compiler 304 in FIG. 4.

Process 900 begins by identifying an instruction that should be protected from soft errors (step 902). Process 900 marks the instruction for duplication at execution (step 904). For example, process 900 may utilize an embodiment for identifying and marking an instruction for duplication as described elsewhere in this disclosure. Process 900 sends the marked instruction for execution, such as to duplicating front end 820 in FIG. 8 (step 906). Process 900 ends thereafter.

Figure 10:
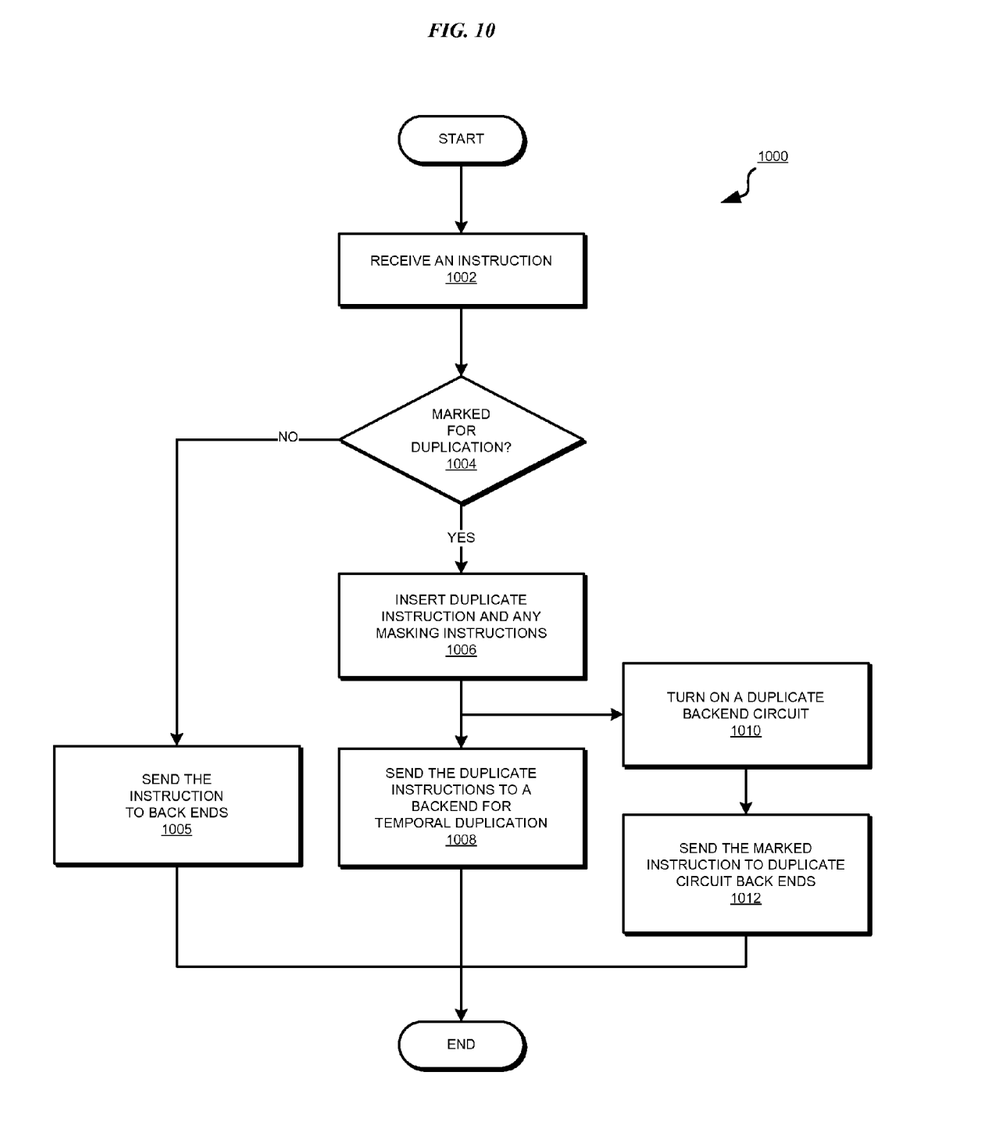
FIG. 10 depicts a flowchart of an example process of selectively duplicating an instruction for tolerating soft errors in accordance with an illustrative embodiment.

With reference to FIG. 10, this figure depicts a flowchart of an example process of selectively duplicating an instruction for tolerating soft errors in accordance with an illustrative embodiment. Process 1000 may be implemented in a front end, such as front end 820 in FIG. 8.

Process 1000 begins by receiving an instruction (step 1002). Process 1000 determines whether the instruction is marked for duplication (step 1004).

If the instruction is not marked for duplication, such as in a bitmask of a "semask" instruction ("No" path of step 1004), process 1000 sends the instruction to the back end (step 1005). Process 1000 ends thereafter.

If the instruction is marked for duplication, such as in a bitmask of a "semask" instruction ("Yes" path of step 1004), process 1000 inserts duplicate instructions or micro ops and sends them to the back end (step 1006). Process 1000 may also insert in step 1006 any masking or error correcting instructions such as micro ops 806 in FIG. 8.

Process 1000 may take a path suitable for a given implementation thereafter. Two example paths are depicted for two example duplication architectures. Process 1000 may send the duplicate instructions and any additional instructions to a backend for temporal duplication (step 1008). Process 1000 may end thereafter.

Alternatively, process 1000 may turn on a duplicate back end circuit (step 1010). Process 1000 may send the duplicate instructions and any additional instructions to the duplicate back end circuits for hardware duplications (step 1012). Process 1000 may end thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for tolerating soft errors by selective duplication. Using an embodiment of the invention, the cost of handling soft errors in a data processing environment can be reduced.

An embodiment may reduce the cost of handling soft errors by duplicating only certain instructions that are susceptible to soft errors and avoiding large scale duplicate computations, which consume computing resources. Another embodiment can achieve cost reduction by turning on and turning off a duplicate back end circuit only for certain instructions and turning the duplicate circuit off for other instructions. In this manner, an embodiment can conserve power and other computing resources presently used for handling soft errors.

As an implementation example, an embodiment can be implemented in relation to an out-of-order superscalar processor. In such an implementation according to an embodiment, the front end, such as front end 520 in FIG. 5, sequentially fetches instructions from a memory to process. Typically, the front end dispatches instructions to the back end, such as back end 524 in FIG. 5. The back end is capable of simultaneously executing multiple instructions in non-sequential order.

Continuing with the example implementation according to an embodiment, upon encountering a "semask" instruction as in FIG. 6, a front end modified according to an embodiment determines using the supplied bitmask, which of the subsequent instructions are to be selectively duplicated. In the example in FIG. 6, only the "ldd" instruction is marked for selective duplication, but any number of instructions in any position in the set may be so marked.

As in FIG. 7, for the unmarked instructions that are not selected for duplication, the modified front end will dispatch computation to the back end without regard to resilience. As depicted in the example of FIG. 8, instructions that are marked for duplication are treated differently than other non-marked instructions. For example, the modified front end can duplicate the marked instruction—original "ldd" instruction—into redundant streams of computation 804 in FIG. 8, complete with their own state. In other words, the redundant streams write to disparate physical registers. According to this example embodiment, the modified front end can dispatch additional computation, such as instruction 806 in FIG. 8, to ensure that the results of the redundant streams are consistent. Note that if the back end supports multiple independent load instructions, the redundant computations 804 in FIG. 8 can proceed simultaneously.

In one embodiment, the modified front end can detect soft errors via selective duplication. In another embodiment designed to detect and repair soft errors, the modified front end can inject into the back end, multiple redundant instructions and ancillary computation, such as, for example, computation that implements a voting scheme, to likely correct soft errors.

The invention can take the form of an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for tolerating soft errors by selective duplication, the computer implemented method comprising:

selecting, at an application executing in a data processing system, an instruction that has to be protected from soft errors;

marking the instruction with a mark for duplication such that the instruction is duplicated during execution of the instruction; and sending the instruction and the mark for execution to a hardware front end.

2. The computer implemented method of claim 1, wherein the instruction is an instruction in a set of instructions, further comprising:

generating the set of instructions such that the hardware front end recognizes the mark as identifying the instruction for duplication and duplicates the instruction.

3. The computer implemented method of claim 2, wherein the generating further comprises:

adding a second instruction to the set of instructions, the second instruction informing the front end that the set includes at least one instruction that has to be duplicated, the at least one instruction including the instruction.

4. The computer implemented method of claim 2, wherein the generating further comprises:

providing a flag with the instruction, the front end interpreting the presence of the flag as the instruction requiring duplication.

5. The computer implemented method of claim 3, wherein the second instruction includes data that identifies a location of the instruction in the set of instructions.

6. The computer implemented method of claim 1, further comprising:

determining, at the hardware front end, that the instruction is to be duplicated;

creating a third instruction, the third instruction duplicating a computation of the instruction; and sending the instruction and the third instruction for execution at a back end.

7. The computer implemented method of claim 6, wherein the third instruction is sent to a second back end for execution.

8. The computer implemented method of claim 6, further comprising:

creating at least one fourth instruction, the at least one fourth instruction configured to correct an error detected by executing the instruction and the third instruction.

9. The computer implemented method of claim 1 wherein the instruction is selected based on whether a degree of susceptibility to the soft error of the instruction is greater than a threshold.

10. The computer implemented method of claim 1, wherein the application is a compiler, and the instruction is an instruction of a program code of a second application resulting from the compiler compiling the second application.

11. A computer usable program product comprising a computer usable storage medium including computer usable code for tolerating soft errors by selective duplication, the computer usable code comprising:

computer usable code for selecting, at an application executing in a data processing system, an instruction that has to be protected from soft errors;

computer usable code for marking the instruction with a mark for duplication such that the instruction is duplicated during execution of the instruction; and computer usable code for sending the instruction and the mark for execution to a hardware front end.

12. The computer implemented method of claim 11, wherein the instruction is an instruction in a set of instructions, further comprising:

computer usable code for generating the set of instructions such that the hardware front end recognizes the mark as identifying the instruction for duplication and duplicates the instruction.

13. The computer implemented method of claim 12, wherein the generating further comprises:

computer usable code for adding a second instruction to the set of instructions, the second instruction informing the front end that the set includes at least one instruction that has to be duplicated, the at least one instruction including the instruction.

14. The computer implemented method of claim 12, wherein the generating further comprises:

computer usable code for providing a flag with the instruction, the front end interpreting the presence of the flag as the instruction requiring duplication.

15. The computer implemented method of claim 13, wherein the second instruction includes data that identifies a location of the instruction in the set of instructions.

16. The computer implemented method of claim 11, further comprising:

computer usable code for determining, at the hardware front end, that the instruction is to be duplicated;

computer usable code for creating a third instruction, the third instruction duplicating a computation of the instruction; and computer usable code for sending the instruction and the third instruction for execution at a back end.

17. The computer usable program product of claim 11, wherein the computer usable code is stored in a computer readable storage medium in a data processing system, and wherein the computer usable code is transferred over a network from a remote data processing system.

18. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

19. An apparatus for tolerating soft errors by selective duplication, the apparatus comprising:

a storage device including a storage medium, wherein the storage device stores computer usable instructions;

a back end, wherein the back end executes the computer usable instructions; and a front end hardware, the front end duplicating an instruction in the computer usable instructions, the instruction having been marked using a mark for duplication during execution for protecting the instruction from soft errors, the front end recognizing the instruction for duplication using the mark in the computer usable instructions.

20. The apparatus of claim 19, wherein the front end recognizes the instruction by evaluating a second instruction in the computer usable instructions, the second instruction informing the front end that the instruction has to be duplicated by providing a flag corresponding to the instruction, the front end interpreting the presence of the flag as the instruction requiring duplication.

* * * * *